(12) United States Patent
Ho et al.

(10) Patent No.: US 12,142,964 B2
(45) Date of Patent: Nov. 12, 2024

(54) HIGH EFFICIENCY CONTROL METHOD FOR UPS

(71) Applicant: SCHNEIDER ELECTRIC IT CORPORATION, Foxboro, MA (US)

(72) Inventors: Andraw Chih-Feng Ho, Taoyuan District (TW); Kuo-Liang Lee, Taipei (TW)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 84 days.

(21) Appl. No.: 18/143,792

(22) Filed: May 5, 2023

(65) Prior Publication Data

US 2023/0352970 A1   Nov. 2, 2023

Related U.S. Application Data

(63) Continuation of application No. 17/485,679, filed on Sep. 27, 2021, now Pat. No. 11,689,047.

(30) Foreign Application Priority Data

Oct. 27, 2020 (CN) .......................... 202011163672.6

(51) Int. Cl.
 *H02J 9/06* (2006.01)
 *H02M 1/00* (2006.01)
 *H02M 5/458* (2006.01)
(52) U.S. Cl.
 CPC ............. *H02J 9/062* (2013.01); *H02M 1/007* (2021.05); *H02M 5/4585* (2013.01)
(58) Field of Classification Search
 CPC ....... H02J 9/062; H02M 1/007; H02M 5/4585
 (Continued)

(56) References Cited

U.S. PATENT DOCUMENTS

| 10,211,670 B2* | 2/2019 | Johansen ................. H02J 9/061 |
| 2005/0036253 A1* | 2/2005 | Tian ......................... H02J 9/062 |
| | | 361/66 |

(Continued)

FOREIGN PATENT DOCUMENTS

| CN | 103683356 A | 3/2014 |
| CN | 106464003 A | 2/2017 |

(Continued)

OTHER PUBLICATIONS

Extended European Search Report from corresponding European Application No. 21200447.7 dated Feb. 24, 2022.

*Primary Examiner* — Yamane Mehari
(74) *Attorney, Agent, or Firm* — Lando & Anastasi, LLP

(57) ABSTRACT

An Uninterruptible Power Supply (UPS) including a charger configured to convert input AC power into DC power having a first voltage level, a DC-DC converter configured to convert the DC power having the first voltage level into DC power having a DC bus voltage level, a DC bus coupled to the DC-DC converter, an inverter coupled to the output via an output switch and configured to convert the DC power having the DC bus voltage level into output AC power, a bypass line including a bypass switch coupled between the input and the output switch, a rectifier coupled between the bypass line and the DC bus, and a controller configured to operate the UPS in a first mode of operation to provide DC power to the DC bus via the DC-DC converter and in a second mode of operation to provide DC power to the DC bus via the rectifier.

20 Claims, 8 Drawing Sheets

(58) Field of Classification Search
USPC .......................................................... 363/34
See application file for complete search history.

(56) References Cited

U.S. PATENT DOCUMENTS

| | | | |
|---|---|---|---|
| 2016/0294211 A1* | 10/2016 | Tricarico | H02J 7/0068 |
| 2017/0018959 A1* | 1/2017 | Yu | H02J 9/062 |
| 2019/0064274 A1* | 2/2019 | Fu | G01R 31/3828 |
| 2020/0285290 A1* | 9/2020 | Yang | G06F 3/147 |
| 2021/0249897 A1* | 8/2021 | Lin | H02J 7/02 |

FOREIGN PATENT DOCUMENTS

| | | |
|---|---|---|
| CN | 111668913 A | 9/2020 |
| EP | 2899836 A1 | 7/2015 |
| WO | 2015152938 A1 | 10/2015 |

* cited by examiner

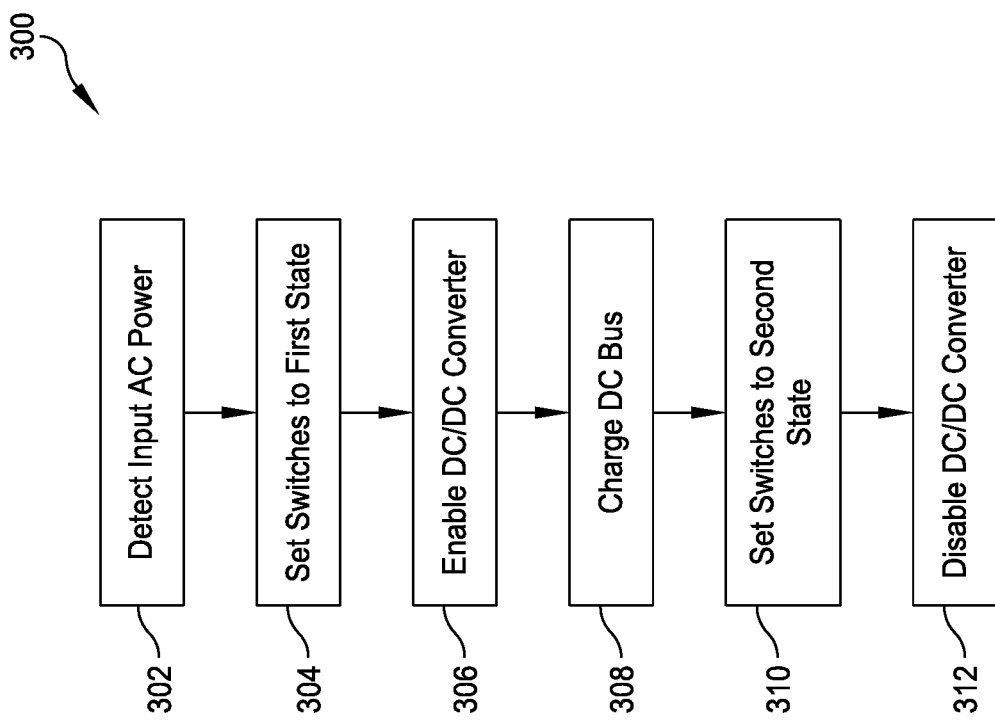

HIGH EFFICIENCY CONTROL METHOD FOR UPS

CROSS-REFERENCE TO RELATED APPLICATION

This application is a continuation of U.S. patent application Ser. No. 17/485,679, filed Sep. 27, 2021, which claims the benefit under 35 U.S.C. § 119 of Chinese Patent Application No. 202011163672.6, filed Oct. 27, 2020. Each application referenced above is hereby incorporated herein by reference in its entirety for all purposes.

BACKGROUND

1. Field of Invention

The present disclosure relates generally to uninterruptible power supplies (UPS).

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

SUMMARY

At least one aspect of the present disclosure is directed to an Uninterruptible Power Supply (UPS). The UPS includes an input configured to receive input AC power, an output configured to provide output AC power to a load, a charger coupled to the input and configured to convert the input AC power into DC power having a first voltage level, a DC-DC converter coupled to the charger and configured to convert the DC power having the first voltage level into DC power having a DC bus voltage level, a DC bus coupled to the DC-DC converter and configured to receive the DC power having the DC bus voltage level, an inverter coupled to the output via an output switch and configured to convert the DC power having the DC bus voltage level into the output AC power and provide the output AC power to the output via the output switch, a bypass line including a bypass switch coupled between the input and the output switch and configured to provide the input AC power to the output via the output switch, a rectifier coupled between the bypass line and the DC bus and configured to convert the input AC power on the bypass line into DC power having the DC bus voltage level and to provide DC power having the DC bus voltage level to the DC bus, and a controller coupled to the charger, the DC-DC converter, the inverter, and the bypass switch and configured to operate the UPS in a first mode of operation to provide DC power to the DC bus via the DC-DC converter and in a second mode of operation to provide DC power to the DC bus via the rectifier.

In one embodiment, the controller is configured to operate the UPS in the first mode of operation by operating the charger and the DC converter to provide DC power to the DC bus derived from the input AC power. In some embodiments, the UPS includes a backup power input coupled to the DC/DC converter configured to receive backup DC power having the first voltage level from a backup power source. In certain embodiments, the controller is configured to operate the UPS in the first mode of operation by operating the DC/DC converter to provide DC power derived from the backup DC power to the DC bus. In various embodiments, the controller is configured to operate the charger to provide DC power having the first voltage level derived from the input AC power to the backup power input to charge the backup power source during the second mode of operation.

In some embodiments, the controller is configured to operate the DC/DC converter to provide DC power having the first voltage level derived from the DC bus to the backup power input to charge the backup power source during the second mode of operation. In various embodiments, the controller is configured to operate the DC-DC converter and the inverter in a third mode of operation to provide output AC power derived from the backup DC power. In certain embodiments, the controller is configured to operate the UPS in the first mode of operation by controlling the output switch to decouple the bypass line from the output. In one embodiment, the controller is configured to operate the UPS in the second mode of operation by controlling the output switch to couple the bypass line to the output such that the input AC power is provided as the output AC power to the output.

In various embodiments, the DC bus includes a first voltage rail, a second voltage rail, and at least one DC bus capacitor coupled between the first voltage rail and the second voltage rail. In some embodiments, the controller is configured to operate the UPS in the first mode of operation to charge the at least one DC bus capacitor to the DC bus voltage level. In one embodiment, the controller is configured to operate the UPS in the second mode of operation to maintain the DC bus voltage level.

Another aspect of the present disclosure is directed to a non-transitory computer-readable medium storing thereon sequences of computer-executable instructions for operating an Uninterruptible Power Supply (UPS) including an output switch configured to selectively couple a bypass line to an output of the UPS. The sequences of computer-executable instructions include instructions that instruct at least one processor to operate the UPS to receive input AC power at an input of the UPS, de-couple, via the output switch, the bypass line from the output, in response to de-coupling the bypass line from the output, operate a DC-DC converter to convert DC power having a first voltage level into DC power having a DC bus voltage level, provide the DC power having the DC bus voltage level from the DC-DC converter to a DC bus to charge the DC bus to the DC bus voltage level, in response to the DC bus being charged, disable the DC-DC converter and couple, via the output switch, the bypass line to the output, provide the input AC power to the output via the bypass line, convert, with a rectifier, the input AC power on the bypass line into DC power having the DC bus voltage level, and provide DC power having the DC bus voltage level to the DC bus via the rectifier to maintain the DC bus voltage level.

In one embodiment, the sequences of instructions include instructions that cause the at least one processor to operate the UPS to operate a charger coupled to the input to convert the input AC power into DC power having the first voltage level. In some embodiments, the sequences of instructions include instructions that cause the at least one processor to operate the UPS to operate the DC-DC converter to convert DC power having the first voltage level into DC power having the DC bus voltage level by operating the DC-DC converter to convert DC power provided from the charger. In certain embodiments, the sequences of instructions include instructions that cause the at least one processor to operate the UPS to receive backup DC power having the first voltage level from a backup power source at a backup power input coupled to the DC/DC converter. In various embodiments, the sequences of instructions include instructions that cause the at least one processor to operate the UPS to operate the DC-DC converter to convert DC power having the first voltage level into DC power having the DC bus voltage level by operating the DC-DC converter to convert the backup DC power provided from the backup power source.

In some embodiments, the sequences of instructions include instructions that cause the at least one processor to operate the UPS to operate the charger to provide DC power having the first voltage level to the backup power input to charge the backup power source. In various embodiments, the sequences of instructions include instructions that cause the at least one processor to operate the UPS to operate the DC-DC converter and an inverter coupled to the DC bus to provide output AC power derived from the backup DC power in response to the input AC power being unacceptable. In one embodiment, the sequences of instructions include instructions that cause the at least one processor to operate the UPS to provide the DC power having the DC bus voltage level from the DC-DC converter to the DC bus to charge the DC bus to the DC bus voltage level by charging at least one DC bus capacitor to the DC bus voltage level. In certain embodiments, the sequences of instructions include instructions that cause the at least one processor to operate the UPS to operate a bypass switch to couple the input to the output via the bypass line.

Another aspect of the present disclosure is directed to a method for operating an Uninterruptible Power Supply (UPS) including an output switch configured to selectively couple a bypass line to an output of the UPS. The method includes receiving input AC power at an input of the UPS, de-coupling, via the output switch, the bypass line from the output, in response to de-coupling the bypass line from the output, operating a DC-DC converter to convert DC power having a first voltage level into DC power having a DC bus voltage level, providing the DC power having the DC bus voltage level from the DC-DC converter to a DC bus to charge the DC bus to the DC bus voltage level, in response to the DC bus being charged, disabling the DC-DC converter and coupling, via the output switch, the bypass line to the output, providing the input AC power to the output via the bypass line, converting, with a rectifier, the input AC power on the bypass line into DC power having the DC bus voltage level, and providing DC power having the DC bus voltage level to the DC bus via the rectifier to maintain the DC bus voltage level.

Another aspect of the present disclosure is directed to a method of assembling an Uninterruptible Power Supply (UPS). The method includes providing a charger configured to be coupled to an input, the charger configured to receive input AC power via the input and convert the input AC power into DC power having a first voltage level, coupling a DC-DC converter to the charger, the DC-DC converter configured to convert the DC power having the first voltage level into DC power having a DC bus voltage level, coupling a DC bus to the DC-DC converter, the DC bus configured to receive the DC power having the DC bus voltage level, coupling an inverter to the DC bus, the inverter configured to convert the DC power having the DC bus voltage level into the output AC power and provide the output AC power to an output via an output switch, coupling a bypass line including a bypass switch between the input and the output switch, the bypass line configured to provide the input AC power to the output via the output switch, coupling a rectifier between the bypass line and the DC bus, the rectifier configured to convert the input AC power on the bypass line into DC power having the DC bus voltage level and to provide DC power having the DC bus voltage level to the DC bus, and coupling a controller to the charger, the DC-DC converter, the inverter, and the bypass switch, the controller configured to operate the UPS in a first mode of operation to provide DC power to the DC bus via the DC-DC converter and in a second mode of operation to provide DC power to the DC bus via the rectifier.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 3 is a flow chart diagram of a control method of a UPS in accordance with aspects described herein;

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS), are oftentimes used to provide regulated, uninterrupted power to sensitive and/or critical loads. An offline UPS connects a load directly to utility power when mains power is available and sufficient to power a load. The offline UPS also includes a charger which utilizes the utility power to charge a backup power source (e.g., a battery). When utility power is unavailable or insufficient to power the load, the offline UPS operates a DC/AC inverter to convert DC power from the backup power source into desired AC power, which is provided to the load.

Figure 1:
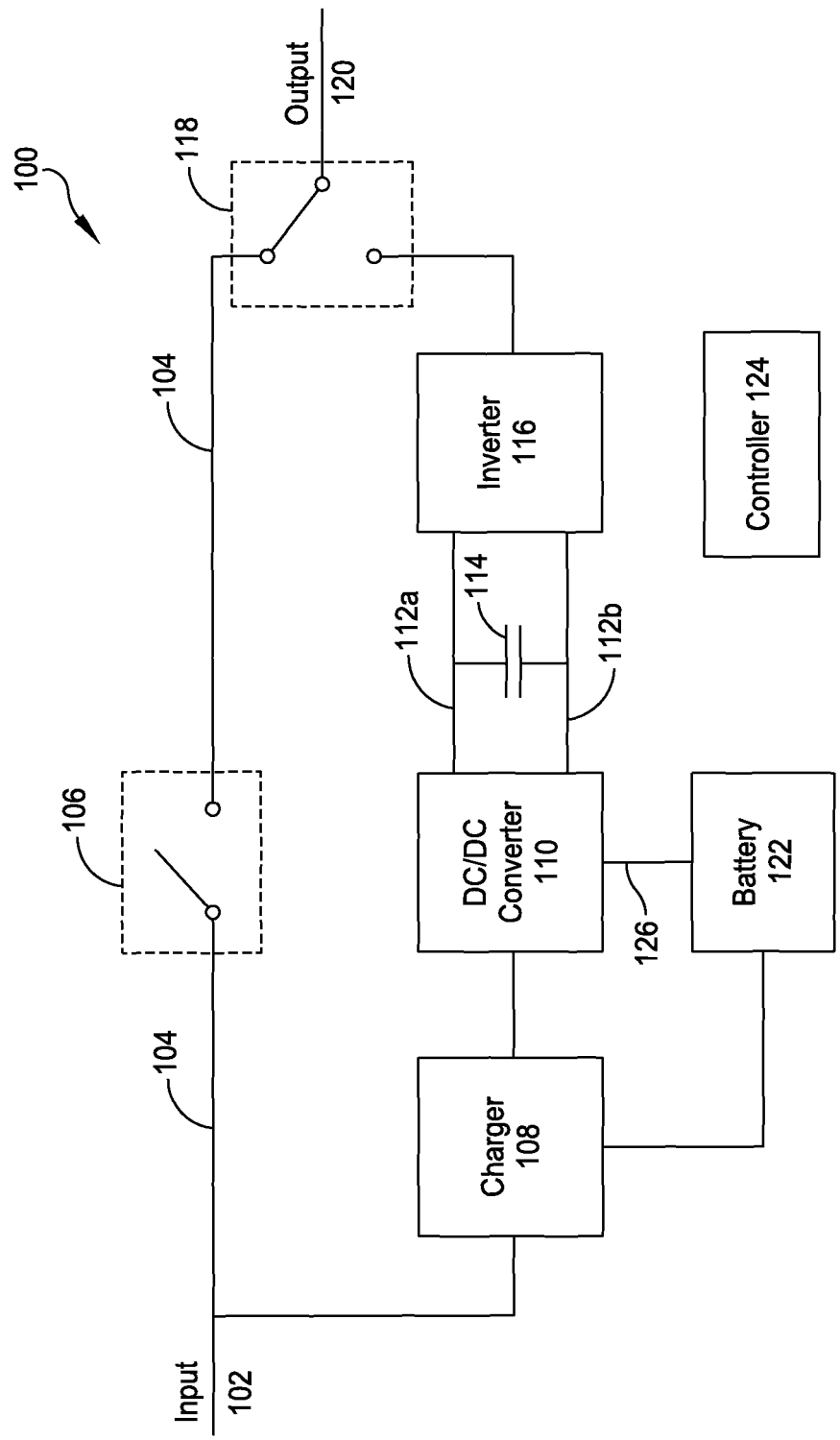
FIG. 1 is a functional block diagram of a UPS in accordance with aspects described herein.

For example, FIG. 1 is a block diagram of one embodiment of an offline UPS 100. The UPS 100 includes an input 102, a bypass line 104, a bypass switch 106, a charger 108, a DC/DC converter 110, a DC bus 112a, 112b (referred to collectively herein as DC bus 112), an inverter 116, an output switch 118, and an output 120. In one example, the DC bus 112 includes a positive rail 112a and a negative rail 112b. In some examples, the UPS 100 may include a battery 122; however, in other examples the battery 122 may be external to the UPS 100.

In addition, a controller 124 may be included in the UPS 100. In one example, the controller 124 may be coupled to and configured to operate the bypass switch 106, the charger 108, the DC/DC converter 110, the inverter 116, and the output switch 118. In certain examples, the controller 124 may be external to the UPS 100. In some examples, the controller 124 includes one or more controllers (or processors).

The input 102 is coupled to the bypass line 104 and the charger 108. The output 120 is coupled to the bypass line 104 and the inverter 116 via the output switch 118. The charger 108 is coupled to the input 102, the DC/DC converter 108, and the battery 122. The DC/DC converter 110 is coupled to the DC bus 112 and the battery 122. In certain examples, the battery 122 is coupled to the DC/DC converter 110 via a backup power input 126. In some examples, the DC bus 112 includes at least one DC bus capacitor 114 coupled between the positive rail 112a and the negative rail 112b. The inverter 116 is coupled to the DC bus 112 and the output switch 118.

The UPS 100 is generally configured to operate in one of at least two modes of operation, including a line mode and a battery mode. The mode of operation of the UPS 100 is dependent upon a quality level of AC power received at the input 102 (for example, from a utility mains AC power supply). For example, when the AC power received at the input 102 is acceptable (i.e., within a specified range of acceptable electrical parameters), the UPS 100 may be configured to operate in the line mode. Otherwise, when the AC power received at the input 102 is not acceptable (i.e., not within a specified range of acceptable electrical parameters), the UPS 100 may be configured to operate in the battery mode. In some examples, the controller 124 may be coupled to the input 102 and configured to monitor the input 102 to determine whether to operate the UPS in the line mode or the battery mode.

In the line mode, the bypass switch 106 is closed to connect the input 102 to the output 120 via the output switch 118. The input 102 receives AC power from an external source (for example, from a utility mains AC power supply) and provides the received power to the output 120 and to the charger 108. The output 120 receives the power from the input 102 and provides the power to an external load (not shown). The charger 108 receives the AC power from the input 102, converts the AC power into DC power, and charges the battery 122 with the DC power derived from the input 102.

When acceptable AC power is not available at the input 102, the UPS 100 operates in battery mode. In the battery mode, the bypass switch 106 is opened, AC power is not provided from the input 102 to the output 120, the charger 108 discontinues charging the battery 122, and the battery 122 discharges stored DC power to the DC/DC converter 110. The DC/DC converter 110 regulates DC power received from the battery 122 and provides regulated DC power to the DC bus 112. The inverter 116 converts the received DC power to AC power and provides the AC power to the output 120 via the output switch 118 to provide electrical power to the external load.

In order to provide uninterrupted power to the load, the offline UPS 100 may be configured to maintain a DC bus voltage on the DC bus 112 coupled between the DC/DC converter 110 and the DC/AC inverter. For example, when operating in the line mode, the charger 108 may be configured to provide DC power derived from the input AC power to the DC/DC converter 110, and the DC/DC converter 110 may provide DC power to the DC bus to maintain the DC bus voltage (i.e., charge the at least one DC bus capacitor 114). As such, the efficiency of the UPS 100 may be limited by the power conversion loss of the charger 108 and/or the DC/DC converter 110.

A more efficient offline UPS topology and control method is provided herein. In at least one embodiment, the topology may include a rectifier coupled between a bypass line and the DC bus of the offline UPS. In one example, the control method includes operating the DC/DC converter of the offline UPS to charge the DC bus to the DC bus voltage and utilizing the rectifier to maintain the DC bus voltage. In some examples, utilizing the rectifier to maintain the DC bus voltage may improve the efficiency of the offline UPS.

Figure 2:
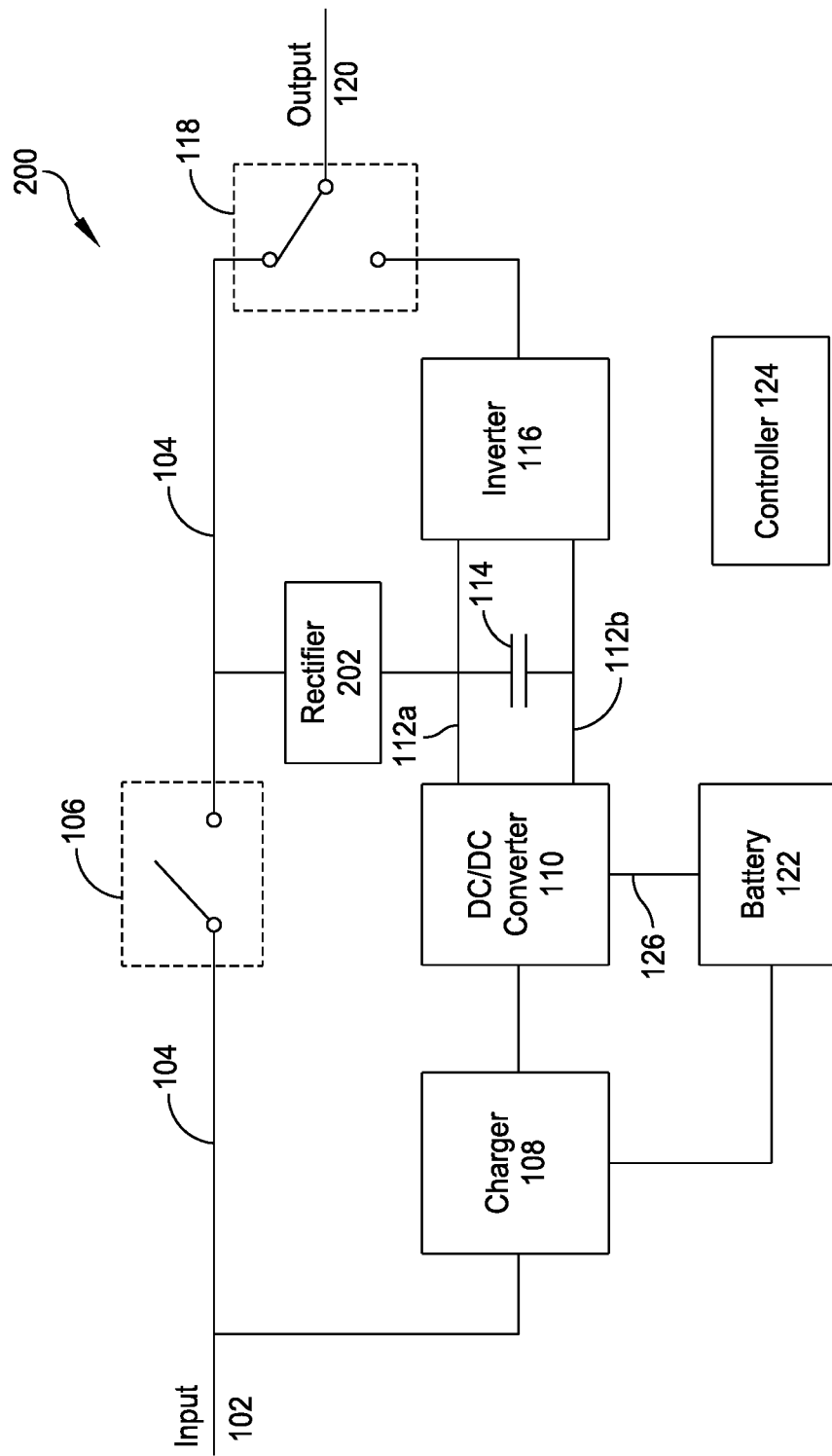
FIG. 2 is a functional block diagram of a UPS in accordance with aspects described herein.

FIG. 2 is a block diagram of an offline UPS 200 in accordance with aspects described herein. In one example, the UPS 200 may be similar to the UPS 100 of FIG. 1, except the UPS 200 includes a rectifier 202 coupled between the bypass line 104 and the DC bus 112. As shown, the rectifier 202 may be coupled to the bypass line 104 after the bypass switch 106 such that when the bypass switch 106 is open, the rectifier 202 is disconnected from the input 102.

FIG. 3 is a flow chart illustrating a control method 300 in accordance with aspects described herein. In one example, the control method 300 corresponds to various modes of operation of the UPS 200 of FIG. 2. At block 302, the UPS 200 is powered into a startup mode of operation. In the startup mode of operation, the controller 124 monitors the input 102 to detect input AC power. In some examples, the controller 124 monitors the input 102 to detect whether the input AC power is acceptable (i.e., at a level sufficient to power the load). At block 304, in response to a detection of acceptable input AC power, the controller 124 operates the bypass switch 106 and the output switch 118 to a first state. In one example, in the first state, the bypass switch 106 is closed and the output switch 118 is controlled such that the output 120 is coupled to the inverter 116 (i.e., decoupled from the bypass line 104).

Figure 4A:
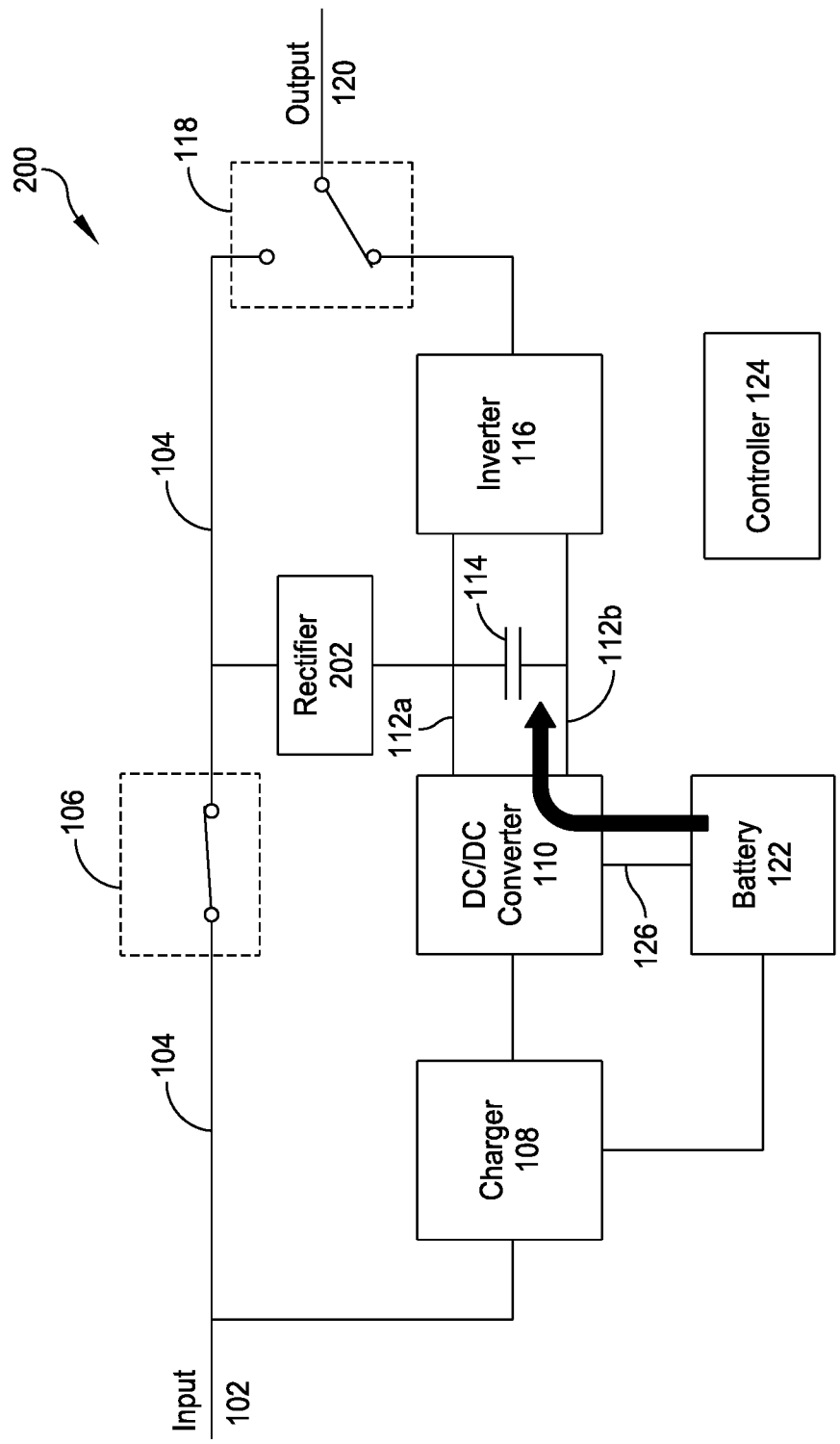
FIG. 4A is a diagram illustrating the operation of a UPS in accordance with aspects described herein.
Figure 4B:
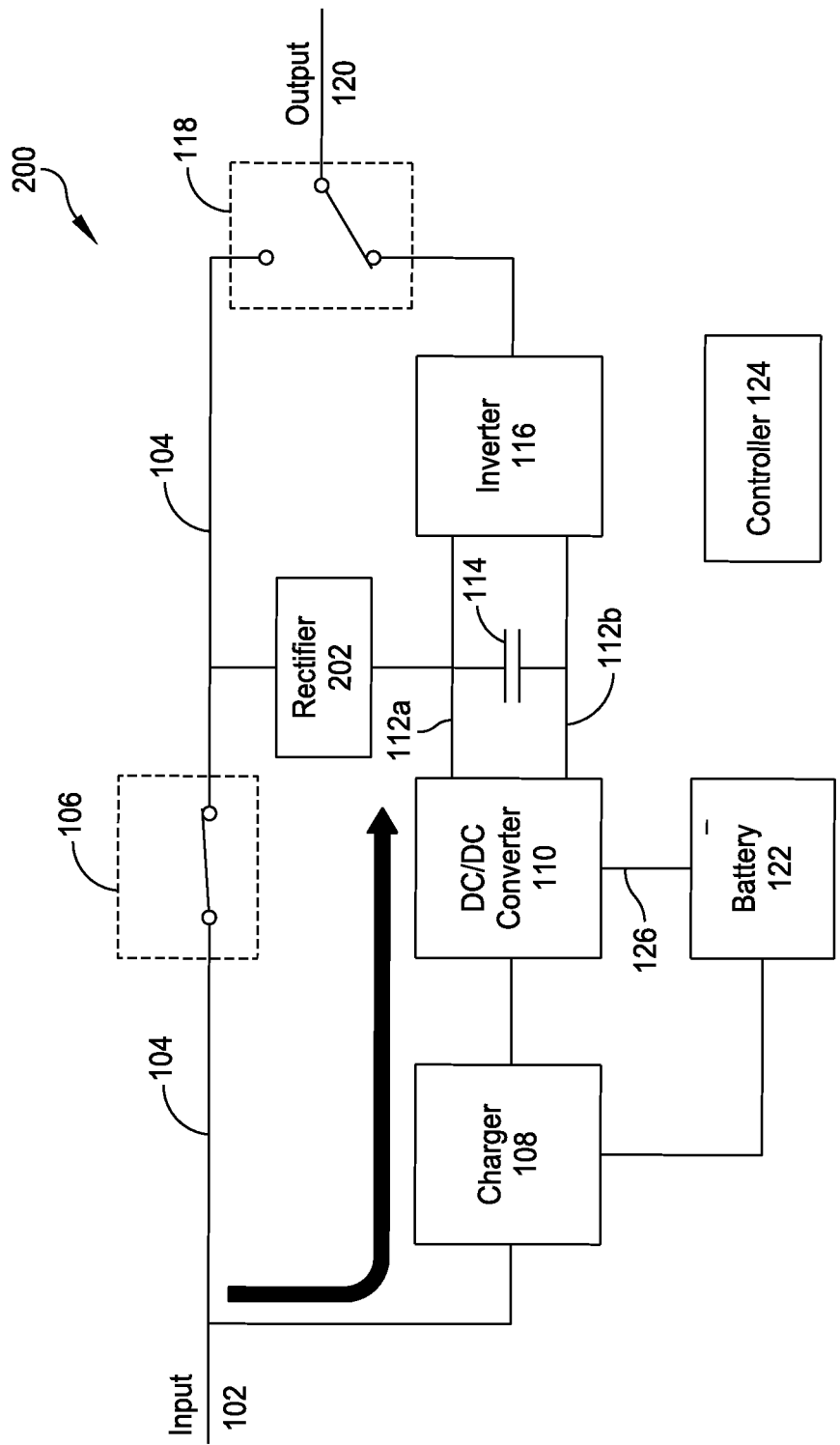
FIG. 4B is a diagram illustrating the operation of a UPS in accordance with aspects described herein.

At block 306, also in the startup mode of operation, the controller 124 enables the DC/DC converter 110. In one example, the controller 124 enables the DC/DC converter 110 by providing a DC enable signal to the DC/DC converter 110. In some examples, the DC enable signal controls one or more switches enabling operation of the DC/DC converter 110. At block 308, after being enabled, the DC/DC converter 110 charges the DC bus 112 to a DC bus voltage level (e.g., 180V). In one example, the DC/DC converter 110 draws DC power from the battery 122 to charge the DC bus 112. In some examples, the DC power drawn from the battery 122 has a first voltage level and the DC/DC converter 110 converts the DC power having the first voltage level into DC power having the DC bus voltage level. For example, as shown in FIG. 4A, the switches 106, 118 are set in the first state and the DC/DC converter 110 provides DC power to the DC bus 112 derived from the battery 122. In other examples, the DC/DC converter 110 operates in conjunction with the charger 108 to convert the input AC power into DC power to charge the DC bus 112. For example, as shown in FIG. 4B, the switches 106, 118 are set in the first state and the charger 108 and the DC/DC converter 110 operate to provide DC power to the DC bus 112 derived from the input AC power. In some examples, the charger 108 converts the input AC power into DC power having the first voltage level and the DC/DC converter 110 converts the DC power having the first voltage level into DC power having the DC bus voltage level. In one example, the DC power provided by the DC/DC converter 110, derived from at least one of the battery 122 or the input AC power, charges the at least one DC bus capacitor 114 to the DC bus voltage level (e.g., 180V). In certain examples, the controller 124 disables the inverter 116 while the DC/DC converter 110 is charging the DC bus 112.

Figure 4C:
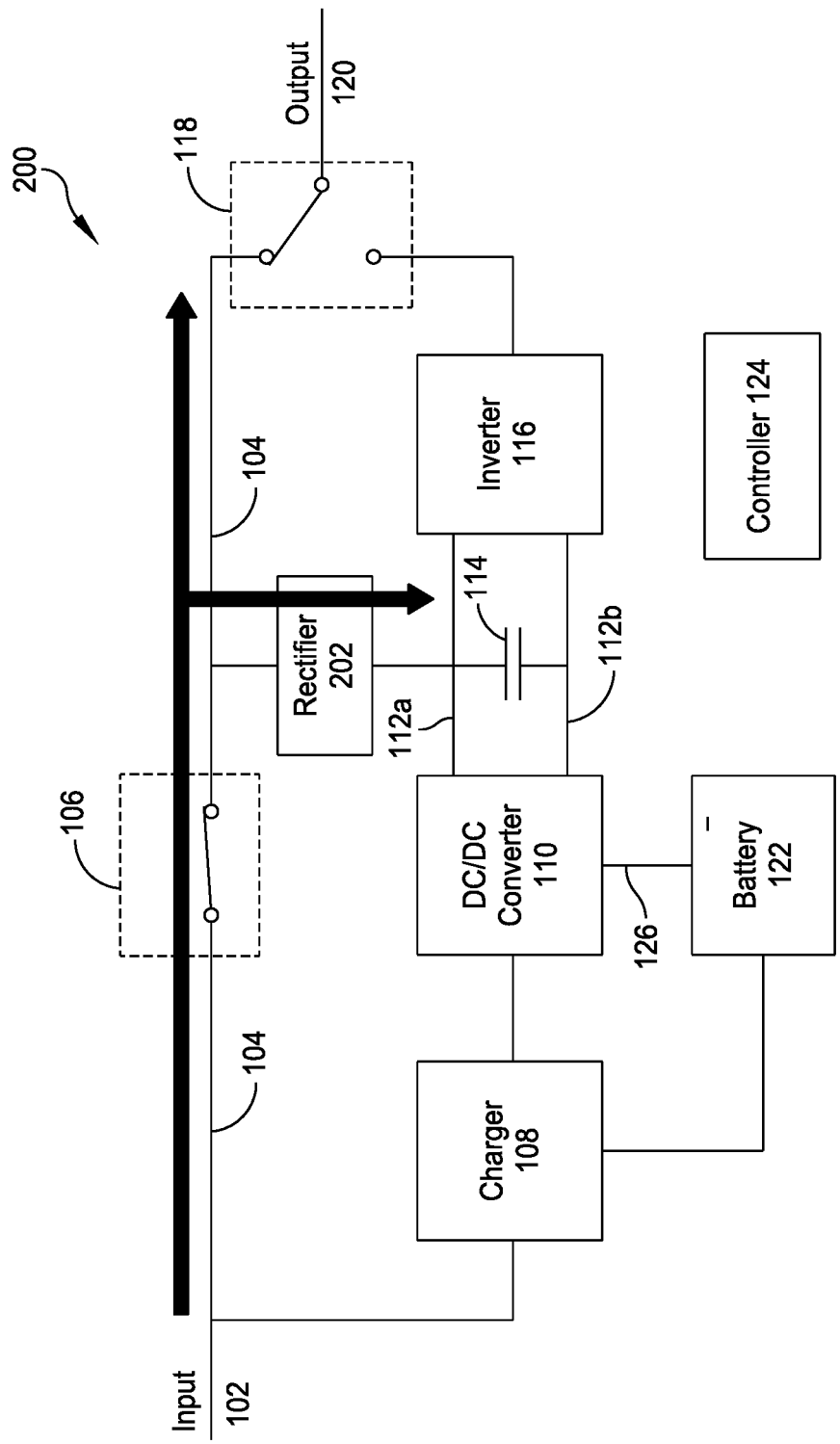
FIG. 4C is a diagram illustrating the operation of a UPS in accordance with aspects described herein.

In one example, once the DC bus 112 has been charged to the DC bus voltage level, the UPS 200 can be transitioned into the line mode of operation. At block 310, the controller 124 transitions the UPS 200 into the line mode of operation by setting the bypass switch 106 and the output switch 118 to a second state. In one example, in the second state, the bypass switch 106 remains closed and the output switch 118 is controlled such that the output 120 is coupled to the bypass line 104. After setting the switches 106, 118 to the second state, the input AC power is provided to the output 120 as the output AC power. At block 312, the controller 124 disables the DC/DC converter 110 (e.g., via the DC enable signal). As shown in FIG. 4C, in the line mode of operation, the input AC power is provided to the output 120 as the output AC power. In addition, the rectifier 202 draws AC power from the bypass line 104, converts the AC power into DC power, and provides the DC power to the DC bus 112 to maintain the DC bus voltage level. In some examples, the rectifier 202 converts the AC power from the bypass line 104 into DC power having the DC bus voltage level (e.g., 180V). Being that the DC/DC converter 110 is disabled during the line mode of operation, power loss associated with the DC/DC converter 110 may be eliminated. In some examples, by utilizing the rectifier 202 to maintain the DC bus voltage level, power loss in the line mode of operation can be reduced up to about 20%. As such, the efficiency of the UPS 200 during the line mode of operation may be improved when compared to the UPS 100 of FIG. 1.

While not shown, the controller 124 may also operate the charger 108 to draw AC power from the input 102, convert the AC power to DC power, and provide the DC power to the battery 122 for charging during the line mode of operation. In one example, the charger 108 converts the AC power into DC power having a charging voltage level (e.g., the first voltage level). In other examples, the DC/DC converter 110 is configured as a bi-directional converter 124 and draws DC power from the DC bus 112 to charge the battery 122. In some examples, when the battery 122 is fully charged, the controller 124 disables the charger 108 in addition to the DC/DC converter 110 to further improve the efficiency of the UPS 200 during the line mode of operation.

Figure 5:
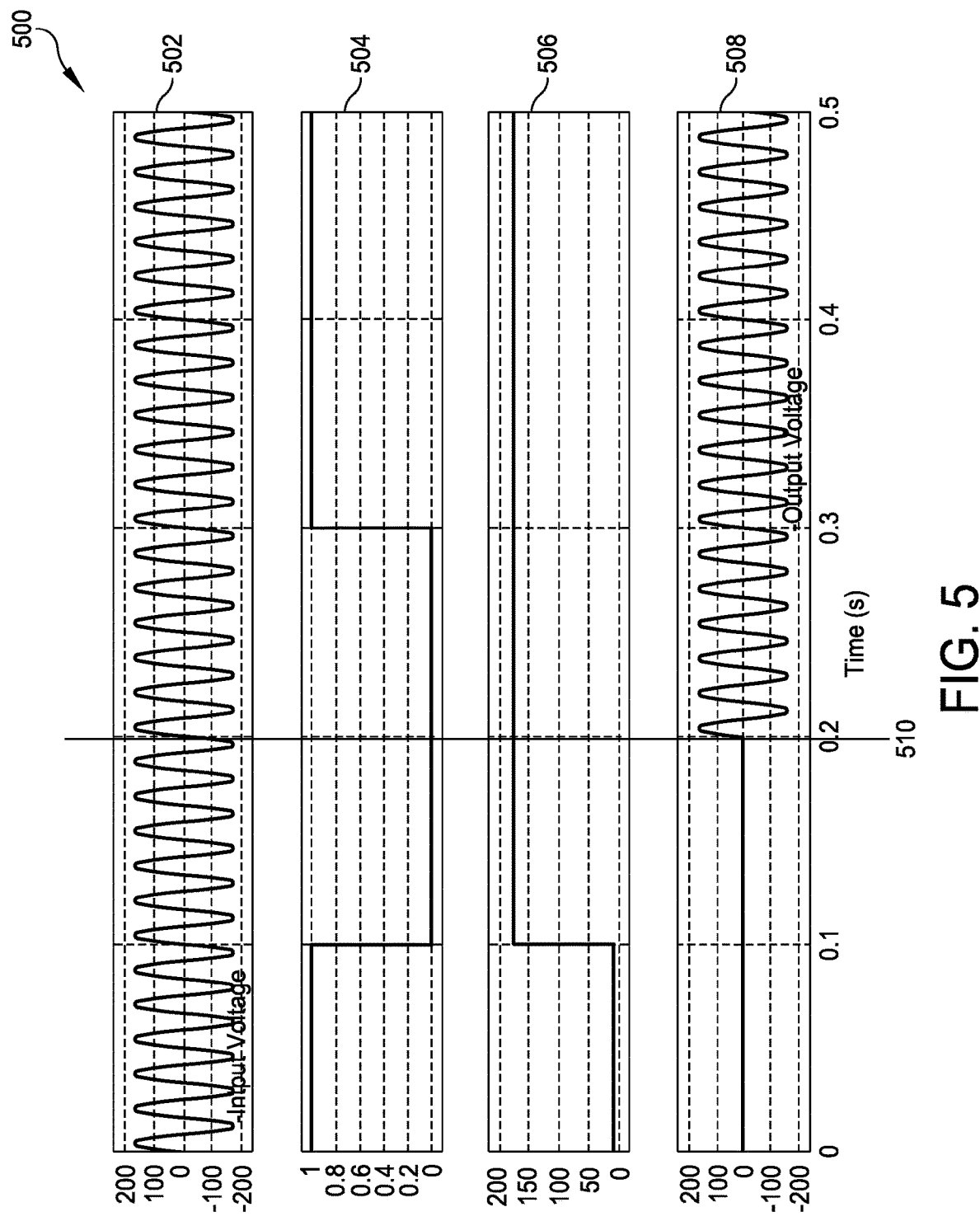
FIG. 5 is a graph of various waveforms associated with the operation of a UPS in accordance with aspects described herein.

FIG. 5 is a graph 500 illustrating various waveforms corresponding to the control method 300 in accordance with aspects described herein. As described above, in the startup mode of operation, the controller 124 monitors the input 102 to detect input AC power. In some examples, the controller 124 monitors the voltage level at the input 102 to detect whether the input AC power is acceptable (i.e., at a sufficient level to power the load) (block 302). As such, the input voltage 502 may correspond to the voltage level of the input AC power received at the input 102. In response to a detection of the input voltage 502 indicating acceptable input AC power, the controller 124 sets the switches 106, 118 to the first state (block 304) and the DC enable signal 504 may be driven low (e.g., 0V) to enable the DC/DC converter 110 (block 306). Once enabled, the DC/DC converter 110 charges the DC bus 112 to the DC bus voltage level using DC power derived from either the battery 122 or the input AC power (block 308). As shown, the DC bus voltage 506 may charge up to the DC bus voltage level (e.g. 180V) in response to the DC/DC converter 110 being enabled. After the DC bus voltage 506 has reached the DC bus voltage level, the switches 106, 118 are set to the second state (indicated at marker 510) and the input voltage 502 is provided to the output 120 as the output voltage 508 (block 310). Once the DC bus voltage 506 has stabilized at the DC voltage level (e.g., 180V), the DC enable signal 504 may be driven high (e.g., 1V) to disable the DC/DC converter 110 (block 312). As such, in the line mode of operation, the input voltage 502 is provided to the output 120 as the output voltage 508 and the rectifier 202 provides DC power to the DC bus 112 to maintain the DC bus voltage 506.

Figure 6:
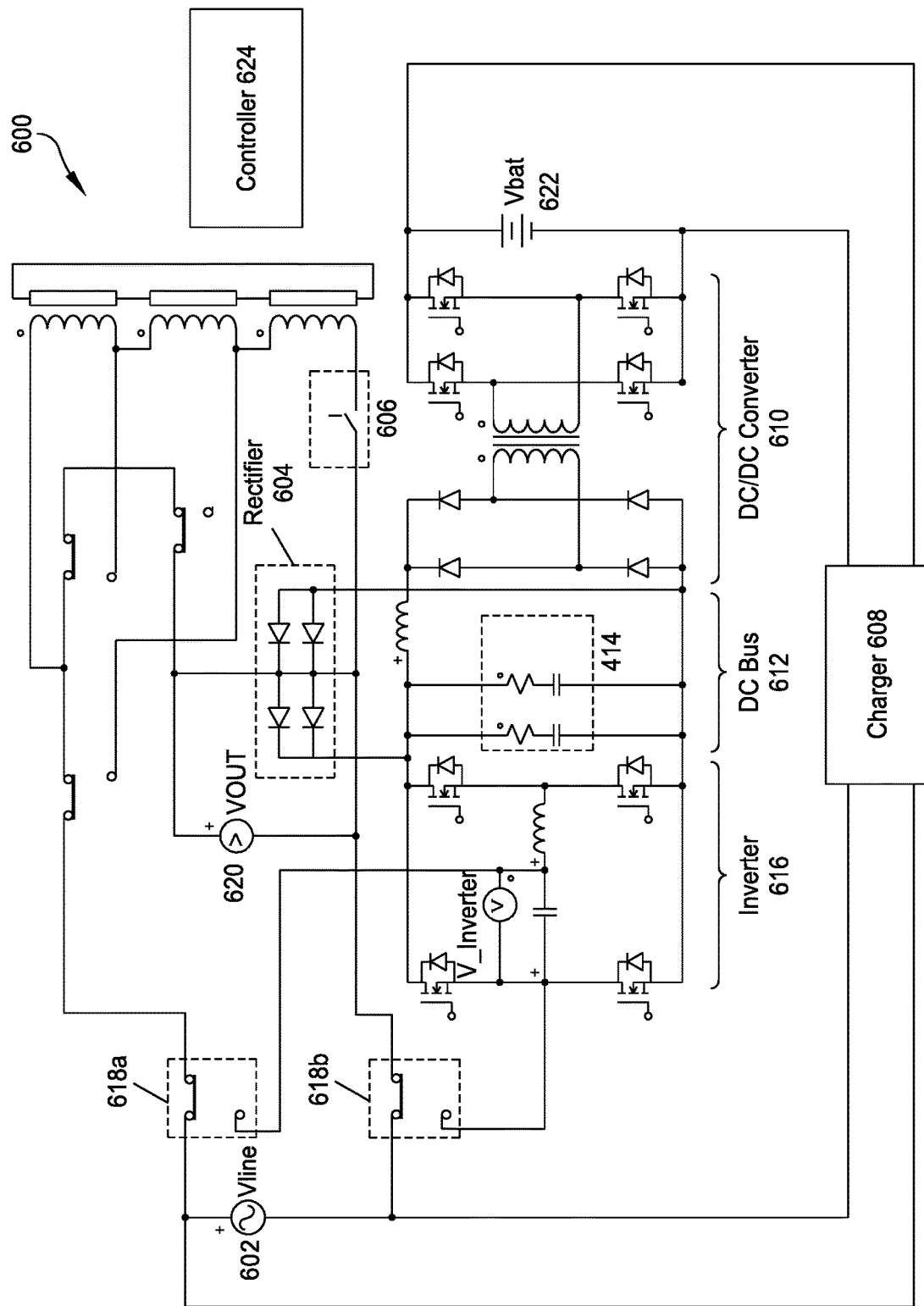
FIG. 6 is a schematic diagram of a UPS in accordance with aspects described herein.

FIG. 6 is a schematic diagram illustrating an offline UPS 600 in accordance with aspects described herein. The UPS 600 includes an input 602, a rectifier 604, a bypass switch 606, a charger 608, a DC/DC converter 610, a DC bus 612, a DC bus capacitor(s) 614, an inverter 616, an output switch 618a, 618b (referred to collectively herein as output switch 618), and an output 620. In some examples, the UPS 600 may include a battery 622; however, in other examples the battery 622 may be external to the UPS 100. In addition, the UPS 600 may include a controller 624 coupled to and configured to operate the elements of the UPS 600. In certain examples, the controller 624 may be external to the UPS 600.

In one example, the UPS 600 is configured to operate similar to the UPS 200 as described above. For example, in the startup mode of operation, the controller 624 monitors the input 602 to detect input AC power, sets the switches

604, 618 to the first state, and enables the DC/DC converter 610 to provide DC power derived from either the battery 622 or the input AC power to charge the DC bus 612 (i.e., the DC bus capacitor(s) 614). Once the DC bus 612 has been charged to the DC bus voltage level (e.g., 180V), the controller 624 sets the switches 604, 618 to the second state. As such, in the line mode of operation, the input AC power is provided to the output 620 as the output AC power. In addition, once the DC bus 112 has stabilized at the DC bus voltage level, the DC/DC converter 610 is disabled and the rectifier 604 draws AC power from the bypass line 604 to maintain the DC bus voltage (e.g., 180V). Being that the DC/DC converter 610 is disabled, the efficiency of the UPS 600 can be improved during the line mode of operation.

In some examples, in the line mode of operation, the charger 608 draws AC power from the input 602, converts the AC power to DC power, and provides the DC power to the battery 622 for charging. In other examples, the DC/DC converter 610 is configured as a bi-directional converter and draws DC power from the DC bus 612 to charge the battery 622. In some examples, when the battery 622 is fully charged, the controller 624 disables the charger 608 in addition to the DC/DC converter 610 to further improve the efficiency of the UPS 600 during the line mode of operation.

In certain examples, being that charger 608 is only operated to charge the DC bus 112 during the startup mode of operation and/or to charge the battery 622 during the line mode of operation, performance requirements associated with components of the charger 608 may be reduced. For example, the power rating of switching components included in the power bridge between the charger 608 and the battery 622 may be lowered. As such, the size and cost of the UPS 600 may be reduced.

As described above, a more efficient offline UPS topology and control method is provided herein. In at least one embodiment, the topology includes a rectifier coupled between the bypass line and the DC bus of the offline UPS. In one example, the control method includes operating the charger and the DC-DC converter of the offline UPS to charge the DC bus to the DC bus voltage and utilizing the rectifier to maintain the DC bus voltage. In some examples, utilizing the rectifier to maintain the DC bus voltage can improve the efficiency of the offline UPS.

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

What is claimed is:

1. An uninterruptible power supply (UPS) comprising:
   a first connection configured to receive first power;
   a second connection configured to receive second power;
   an output configured to provide output power to a load;
   a charger coupled to the first connection and configured to receive first power provided via the first connection and convert the first power into first DC power having a first voltage level;
   a rectifier coupled to the second connection and configured to receive second power provided via the second connection and convert the second power into DC power having a second voltage level;
   a DC bus coupled to the rectifier and configured to receive the DC power having the second voltage level;
   a first converter coupled to DC bus and configured to convert DC power into DC power having the second voltage level; and
   a second converter coupled to the DC bus and configured to convert DC power from the DC bus into output power and provide the output power to the output.

2. The UPS of claim 1 further comprising a controller coupled to the charger, the first converter, and the second converter and configured to selectively operate the UPS:
   in a first mode of operation to provide DC power to the DC bus via the first converter; and
   in a second mode of operation to provide DC power to the DC bus via the rectifier.

3. The UPS of claim 1 further comprising a bypass switch coupled to the second connection and configured to control whether the second connection receives power, and an output switch coupled to the second converter and configured to control whether the output receives output power.

4. The UPS of claim 1 wherein the second connection is a bypass line coupled to an input at one node and to the rectifier at a second node.

5. The UPS of claim 1 wherein the first connection is an input line coupled to an input at one node and to the charger at a second node.

6. The UPS of claim 1 further comprising:
   a backup power source configured to provide backup power; and
   a backup power connection coupled to the backup power source and configured to allow bidirectional provision of power to and from the backup power source, wherein the backup power connection is coupled to a connection of the first converter.

7. The UPS of claim 6 wherein the controller is further configured to operate the UPS in a backup mode of operation where the backup power is provided to the first converter, and the first converter converts the backup power to DC power having the second voltage level and provides DC power having the second voltage level to the DC bus.

8. The UPS of claim 1 wherein the DC bus includes a first voltage rail, a second voltage rail, and at least one capacitor coupled between the first voltage rail and the second voltage rail.

9. The UPS of claim 8 wherein the controller is further configured to operate the UPS such that the capacitor is charged to the second voltage level.

10. The UPS of claim 1 wherein the first converter is coupled to the charger and is configured to convert the first DC power from the charger into DC power having the second voltage level and provide DC power having the second voltage level to the DC bus.

11. A non-transitory computer-readable medium storing thereon computer-executable instructions for at least one processor, the instructions instructing the at least one processor to operate the UPS to:
   receive first power at a first connection;
   receive second power at a second connection;
   convert, via a charger, first power into first DC power having a first voltage level;
   convert, via a rectifier, second power into DC power having a second voltage level;
   provide, via the rectifier, DC power having the second voltage level to a DC bus;
   convert, via a first converter, DC power into DC power having the second voltage level;
   convert, via a second converter, DC power having the second voltage level into output power; and
   provide the output power to a load.

12. The non-transitory computer-readable medium of claim 11 wherein the instructions further instruct the at least one processor to:

selectively operate the UPS in a first mode of operation to provide DC power having the second voltage level to the DC bus via the first converter and to selectively operate the UPS in a second mode of operation to provide DC power having the second voltage level to the DC bus via the rectifier.

13. The non-transitory computer-readable medium of claim 11 wherein the instructions further instruct the at least one processor to:

selectively operate a bypass switch coupled to the second connection to control whether the second connection receives power; and selectively operate an output switch coupled to the second converter to control whether the second converter provides output power to the load.

14. The non-transitory computer-readable medium of claim 11 wherein the instructions further instruct the at least one processor to:

operate the UPS in a backup mode of operation where backup power is provided to the first converter from a backup power source.

15. The non-transitory computer-readable medium of claim 11 wherein the instructions further instruct the at least one processor to:

operate the UPS to convert the first DC power into DC power having the second voltage level by providing the first DC power from the charger to the first converter.

16. A method of conditioning power comprising:

receiving first power at a first connection;

receiving second power at a second connection;

converting, via a charger, first power into first DC power having a first voltage level;

converting, via a rectifier, second power into DC power having a second voltage level;

providing, via the rectifier, DC power having the second voltage level to a DC bus;

converting, via a first converter, DC power into DC power having the second voltage level;

converting, via a second converter, DC power having the second voltage level into output power; and providing output power to a load.

17. The method of claim 16 further comprising:

providing DC power having the second voltage level to the DC bus via the first converter; and providing DC power having the second voltage level to the DC bus via the rectifier.

18. The method of claim 16 further comprising:

selectively operating a bypass switch coupled to the second connection to control whether the second connection receives power; and selectively operating an output switch coupled to the second converter to control whether the second converter provides output power to the load.

19. The method of claim 16 further comprising:

providing backup power to the first converter from a backup power source.

20. The method of claim 16 further comprising:

converting the first DC power into DC power having the second voltage level by providing the first DC power from the charger to the first converter.

\* \* \* \* \*